United States Patent Office 2,940,834
Patented June 14, 1960

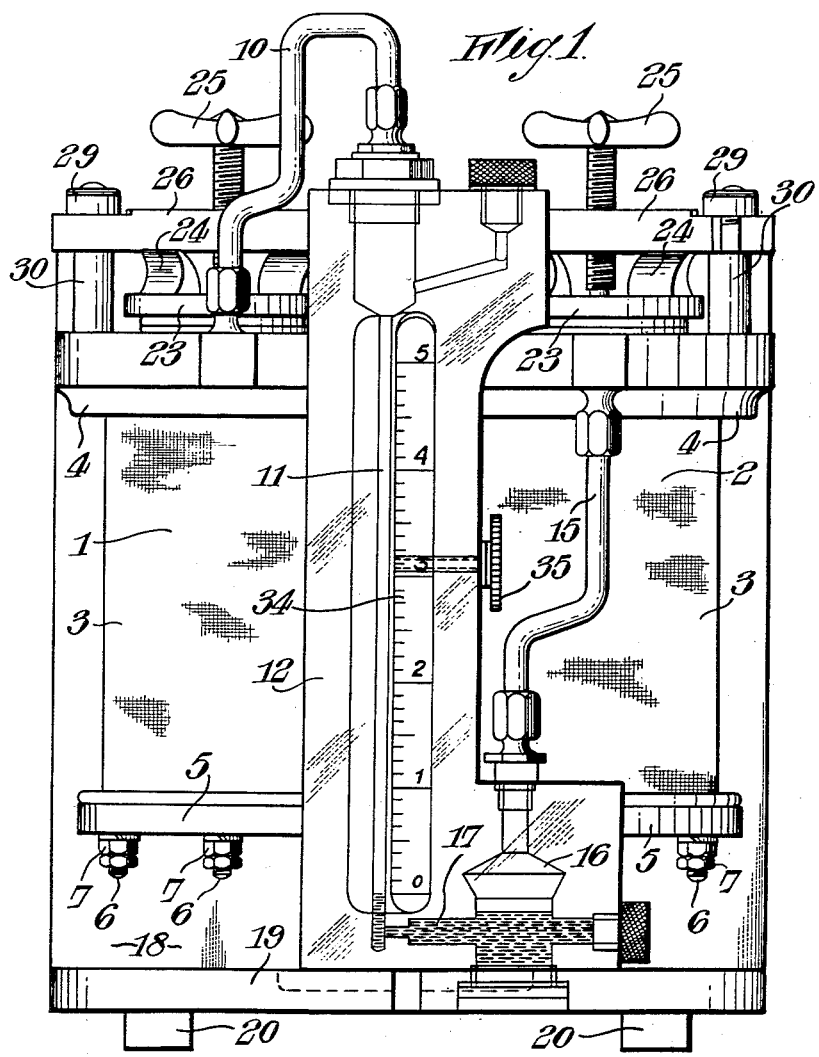

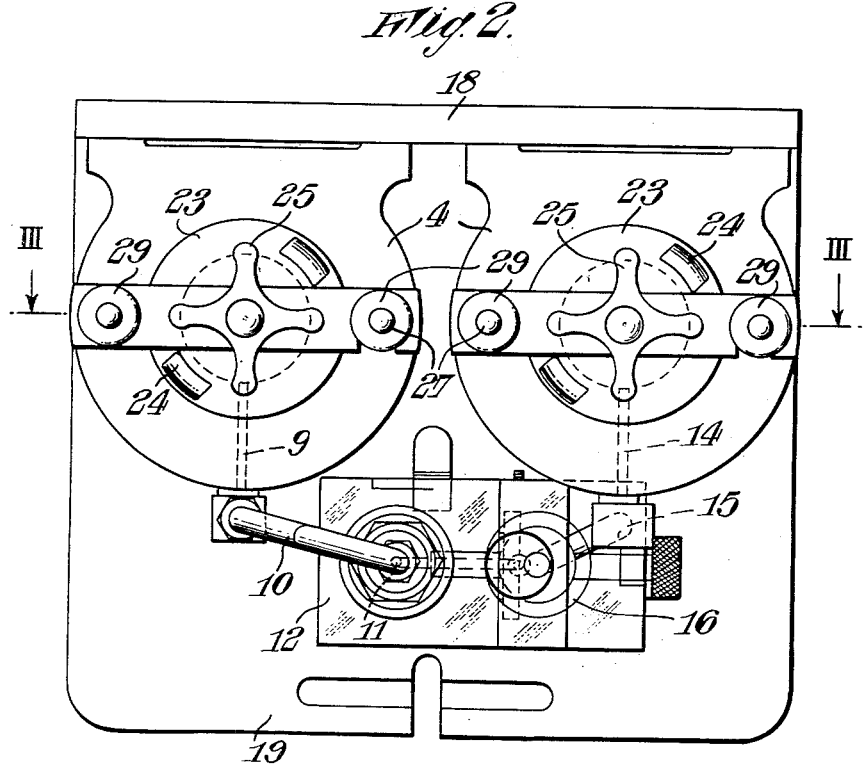

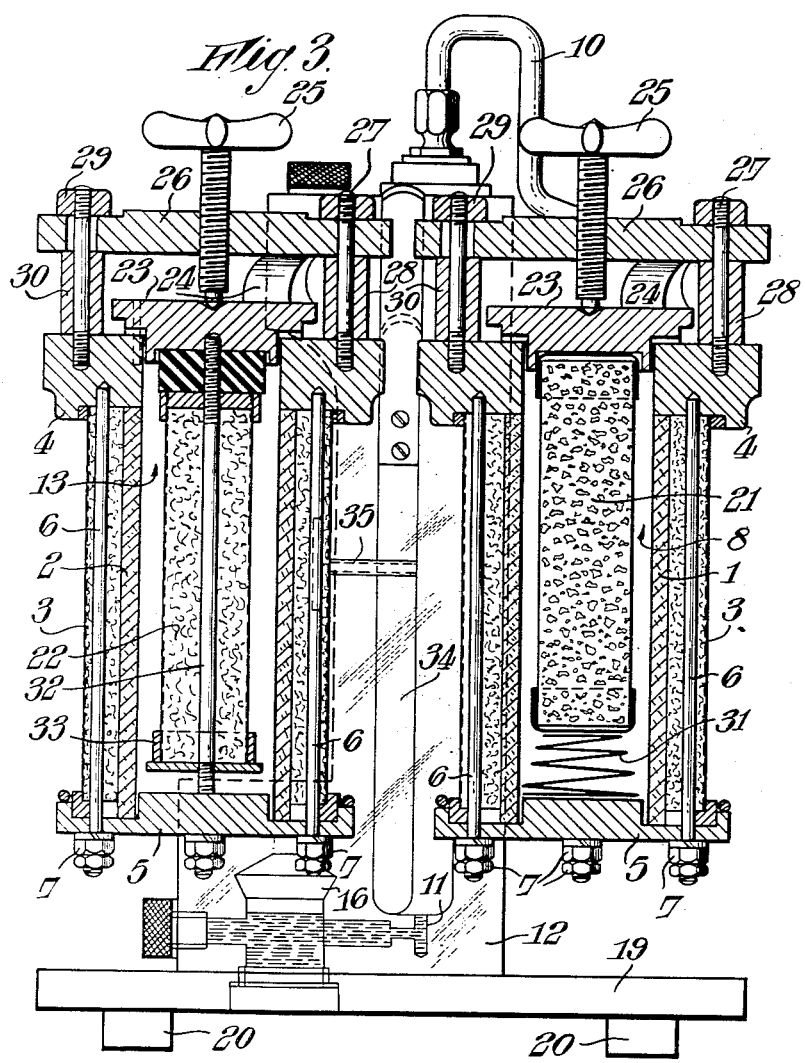

2,940,834

APPARATUS FOR DETECTING AND INDICATING THE PRESENCE AND AMOUNTS OF $CO_2$ IN AN ATMOSPHERE

Henry Thomas Ringrose, Westfield, Arncliffe Road, West Park, Leeds, England

Filed Feb. 3, 1958, Ser. No. 712,874

4 Claims. (Cl. 23—254)

This invention relates to apparatus for detecting and indicating the presence and amounts of $CO_2$ in an atmosphere.

The value to industrial concerns of measuring continuously the percentage of $CO_2$ in an atmosphere has hitherto not required great precision. For instance in the control of combustion conditions $CO_2$ instruments have been accurate enough if within ½% of the true reading. This is now being altered by the need for greater accuracy, particularly where the $CO_2$ is the result of respiration.

It is known that the usual chemical absorbents will not act under perfectly dry conditions and thus most of the absorbents used have a vapour pressure. In consequence an absorbent such as soda lime when placed in a sealed porous pot will give a definite pressure when placed in an external atmosphere containing little moisture. On the other hand, if the atmosphere is very moist, absorption of moisture occurs on the soda lime resulting in a partial vacuum. It will be seen that the accuracy of such instruments could be completely upset by moisture in the surrounding atmosphere and it would therefore be impossible by such a system to obtain any degree of precision in the measurements of $CO_2$.

According to the invention a pair of identical porous vessels are provided, the interior of one vessel being connected to the upper end of a manometer whilst the interior of the other porous vessel is connected to the chamber at the lower end of the manometer tube which contains the indicating liquid. One of the porous vessels has inserted therein a carton of moist soda lime whilst the other vessel has inserted therein a carton of cotton wool or other absorbent material whose hygroscopic properties have been increased by the deposition of or impregnation with calcium chloride to approximate the hygroscopic properties of the moist soda lime so that providing the moisture content of both the soda lime and the absorbent material are substantially the same when they are placed in their respective porous vessels any pressure set up as a result of moisture absorption by the soda lime and the absorbent material within the porous vessels is substantially equalised and does not affect the level of the indicating liquid in the manometer tube.

The porous vessels and manometer will be mounted on a suitable base or frame depending upon the requirements of the particular use to which the apparatus is required.

In order that the invention may be more clearly understood and readily carried into effect the same will now be more fully described with reference to and by the aid of the accompanying drawings, wherein:

Figure 1 is a front elevation of an apparatus constructed in accordance with the invention, but removed from its casing for the sake of clarity.

Figure 2 is a plan of Figure 1.

Figure 3 is a sectional rear elevation on the lines III—III of Figure 2.

Referring to the drawings, a pair of identical porous vessels 1, 2 are provided each surrounded by a reticulated protective casing 3 and clamped between upper and lower plates 4, 5 by means of rods 6 and nuts 7. The interior 8 of the porous vessel 1 is connected by means of a duct 9 and pipe 10 to the upper end of a manometer tube 11 formed in a block 12 of transparent material.

The interior 13 of the other porous vessel 2 is connected by means of a duct 14 and pipe 15 to the chamber 16 of the manometer tube 11 which contains the indicating liquid 17.

The porous vessels together with their clamping plates 4 and 5 are secured to a back plate 18 and the manometer block 12 is secured to the base 19 extending forwardly of the back plate, said base 19 having feet 20 which rest upon the base of a casing (not shown).

The porous vessel 1 has inserted therein a carton of moist soda lime 21 whilst the other porous vessel 2 which acts as a balance chamber has inserted therein a carton of cotton wool or other absorbent material 22 whose hygroscopic properties have been increased by the deposition of or impregnation with calcium chloride to approximate those of the soda lime.

To facilitate the insertion and removal of the cartons 21, 22 from their respective vessels, the upper plates 4 are provided with detachable covers 23 having finger grips 24 and clamped in position by means of clamping screws 25 in pivotal bars 26 hinged at 27 to pillars 28 and secured by engagement with abutments 29 on further pillars 30. The pillars 28 and 30 are secured to the upper plates 4.

The carton 21 is spring loaded at 31 to cause it to project through the opening when the cover is removed to facilitate its removal, whilst the carton 22 is detachably secured to its cover by means of a screwed rod 32 and supporting base member 33 so as to be removed when its cover is removed.

The manometer block 12 will contain a suitable scale 34 capable of being adjusted vertically and secured in the correct position by means of the clamping screw 35.

Before the cartons 21, 22 are inserted in their respective vessels 1, 2 their vapour pressures or moisture content have been allowed to become equalised. This equalisation of vapour pressures or moisture content may be brought about by storing the cartons together in a sealed container and then quickly inserting them into their respective vessels.

In the porous vessels the vapour pressures will remain balanced in spite of changes in the external humidity and changes in the external temperature or pressure will offset the two porous vessels equally.

$CO_2$ is absorbed by the soda lime in the porous vessel 1 and the vacuum created therein is reflected by the height of the liquid in the manometer tube and the amount of $CO_2$ can be read off on the scale.

I claim:

1. In an apparatus for continuously detecting and indicating the presence of and amounts of $CO_2$ in an atmosphere the combination of a pair of identical porous vessels, a manometer tube, a liquid chamber connected to the lower end of the manometer tube, the interior of one vessel being connected to the manometer tube whilst the interior of the other porous vessel is connected to the liquid chamber, one of said porous vessels having inserted therein a carton of moist soda lime whilst the other vessel has inserted therein a carton of absorbent material whose hygroscopic properties have been increased by the addition of calcium chloride, each porous vessel being surrounded by a reticulated protective casing, a back plate having upper and lower supporting plates projecting therefrom said porous vessels being clamped between said upper and lower supporting plates, a base plate extending forwardly of said back plate, the manometer tube being mounted on the said base plate, said upper supporting plates each being provided with a detachable cover capable of being clamped in position, on its upper supporting plate, the soda lime carton being spring loaded in its porous vessel to cause it to project through the opening when the cover is removed to facilitate its removal.

2. In an apparatus for continuously detecting and indicating the presence of and amounts of $CO_2$ in an atmosphere the combination of a pair of identical porous vessels, a manometer tube, a liquid chamber connected to the lower end of the manometer tube, the interior of one vessel being connected to the manometer tube whilst the interior of the other porous vessel is connected to the liquid chamber, one of said porous vessels having inserted therein a carton of moist soda lime whilst the other vessel has inserted therein a carton of cotton wool whose hygroscopic properties have been increased by the addition of calcium chloride, each porous vessel being surrounded by a reticulated protective casing, a back plate having upper and lower supporting plates projecting therefrom said porous vessels being clamped between said upper and lower supporting plates, a base plate extending forwardly of said back plate, the manometer tube being mounted on the said base plate, said upper supporting plates each being provided with a detachable cover capable of being clamped in position, on its upper supporting plate, the soda lime carton being spring loaded in its porous vessel to cause it to project through the opening when the cover is removed to facilitate its removal.

3. In an apparatus for continuously detecting and indicating the presence of and amounts of $CO_2$ in an atmosphere the combination of a pair of identical porous vessels, a manometer tube, a liquid chamber connected to the lower end of the manometer tube, the interior of one vessel being connected to the manometer tube whilst the interior of the other porous vessel is conected to the liquid chamber, one of said porous vessels having inserted therein a carton of moist soda lime whilst the other vessel has inserted therein a carton of absorbent material whose hygroscopic properties have been increased by the addition of calcium chloride, each porous vessel being surrounded by a reticulated protective casing, a back plate having upper and lower supporting plates projecting therefrom said porous vessels being clamped between said upper and lower supporting plates, a base plate extending forwardly of said back plate, the manometer tube being mounted on the said base plate, said upper supporting plates each being provided with a detachable cover capable of being clamped in position, on its upper supporting plate, the soda lime carton being spring loaded in its porous vessel to cause it to project through the opening when the cover is removed to facilitate its removal, the carton of absorbent material being suspended from the detachable cover and removable therewith.

4. In an apparatus for continuously detecting and indicating the presence of and amounts of $CO_2$ in an atmosphere the combination of a pair of identical porous vessels, a manometer tube, a liquid chamber connected to the lower end of the manometer tube, the interior of one vessel being connected to the manometer tube whilst the interior of the other porous vessel is connected to the liquid chamber, one of said porous vessels having inserted therein a carton of moist soda lime whilst the other vessel has inserted therein a carton of cotton wool whose hygroscopic properties have been increased by the addition of calcium chloride, each porous vessel being surrounded by a reticulated protective casing, a back plate having upper and lower supporting plates projecting therefrom said porous vessels being clamped between said upper and lower supporting plates, a base plate extending forwardly of said back plate, the manometer tube being mounted on the said base plate, said upper supporting plates each being provided with a detachable cover capable of being clamped in position, on its upper supporting plate, the soda lime carton being spring loaded in its porous vessel to cause it to project through the opening when the cover is removed to facilitate its removal, the carton of cotton wool being suspended from the detachable cover and removable therewith.

References Cited in the file of this patent

UNITED STATES PATENTS

| 1,223,953 | Frisak | Apr. 23, 1917 |
| 2,137,969 | Dowling | Feb. 21, 1939 |
| 2,181,013 | Dwyer | Nov. 21, 1939 |

FOREIGN PATENTS

| 107,811 | Great Britain | July 12, 1917 |
| 342,949 | Great Britain | Feb. 12, 1931 |
| 361,279 | Great Britain | Nov. 19, 1931 |
| 516,992 | Great Britain | Jan. 17, 1940 |